United States Patent [19]
Iwase

[11] Patent Number: 5,089,893
[45] Date of Patent: Feb. 18, 1992

[54] PICTURE ELEMENT NUMBER CONVERTER

[75] Inventor: Seiichiro Iwase, Kanagawa, Japan

[73] Assignee: Sony Corporation, Tokyo, Japan

[21] Appl. No.: 608,372

[22] Filed: Nov. 2, 1990

[30] Foreign Application Priority Data

Nov. 14, 1989 [JP] Japan .................. 1-295766

[51] Int. Cl.⁵ ................ H04N 3/223; H04N 7/01
[52] U.S. Cl. .................... 358/180; 358/140; 358/22; 358/11; 382/47
[58] Field of Search ............ 358/180, 140, 22, 160, 358/36, 37, 166, 167, 451, 11; 382/47

[56] References Cited

U.S. PATENT DOCUMENTS

| | | | |
|---|---|---|---|
| 4,528,585 | 7/1985 | Bolger | 358/180 |
| 4,610,026 | 9/1986 | Tabata et al. | 358/180 |
| 4,651,223 | 3/1987 | Sasaki et al. | 358/451 |
| 4,746,981 | 5/1988 | Nadan et al. | 358/22 |
| 4,774,581 | 9/1988 | Shiratsuchi | 358/180 |
| 4,792,856 | 12/1988 | Shiratsuchi | 358/180 |
| 4,809,345 | 2/1989 | Tabata et al. | 358/451 |
| 4,930,021 | 5/1990 | Okada | 358/451 |
| 5,010,413 | 4/1991 | Bahr | 358/22 |

Primary Examiner—James J. Groody
Assistant Examiner—Michael H. Lee
Attorney, Agent, or Firm—Alvin Sinderbrand; William S. Frommer

[57] ABSTRACT

An original picture of an interlace system is magnified or reduced by an integer ration of M to N to form a conversion picture. A unit length U is obtained by dividing the distance between vertically adjacent picture elements of the original or the conversion pictures by N or M, respectively. The positions of the picture elements of both fields of the conversion picture are shifted by $|M-N|/4 \cdot U$ from the respective positions that would have been occupied by the picture elements of the conversion picture.

3 Claims, 8 Drawing Sheets

PICTURE ELEMENT NUMBER CONVERTER

BACKGROUND OF THE INVENTION

1. Field of the Invention

The present invention relates to a converting technique for magnifying or reducing the size of a picture of an interlace system by an arbitrary integer ratio.

2. Description of the Prior Art

A prior art technique for magnifying or reducing an original picture of an interlace system by an arbitrary integer ratio is achieved by manipulating, that is, by increasing or decreasing the number of picture elements with respect to the original picture and by rearranging the manipulated picture elements at the same interval as that of the original picture.

In the above prior art technique, in order to magnify the original picture two times, for example, an interpolation operation which doubles the number of picture elements is performed.

Figure 1:
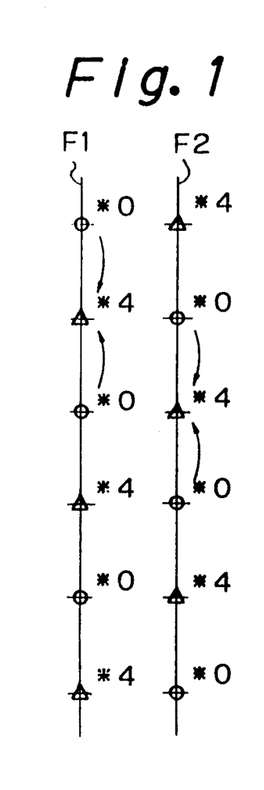
FIGS. 1 and 2 are diagrams for describing conventional conversion processing of picture elements.

However, as shown in FIG. 1, if an original picture element is interpolated so as to double the number of the picture elements for every field, or to magnify the original picture, an interlaced picture cannot be formed. In FIG. 1, circles represent original picture elements and triangles represent interpolated picture elements. Further, the longitudinal axis represents the vertical direction of a picture and a horizontal axis (not shown) represents a time axis. F1 and F2 are two fields which may be interlaced with each other.

Figure 2:
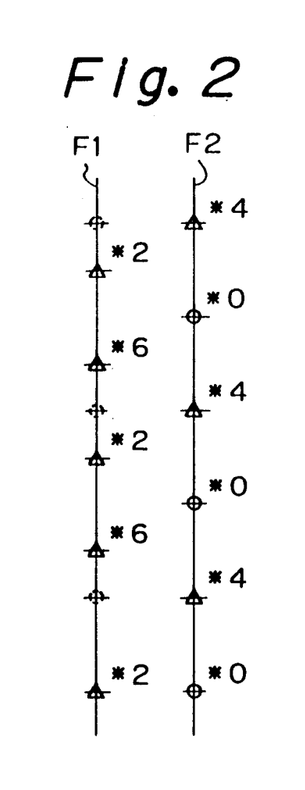

As a result, linear interpolation is utilized to provide an interlaced picture as shown in FIG. 2. In FIG. 2, circles having broken lines represent original picture elements which disappear after the interpolation; circles having solid lines represent interpolation picture elements whose positions correspond to those of the original picture elements after the interpolation; and triangles represent interpolation picture elements whose positions do not correspond to those of the original picture elements after the interpolation. However, in the linear interpolation shown in FIG. 2., a problem known as flickering occurs in the picture as hereinafter described.

Figure 3:
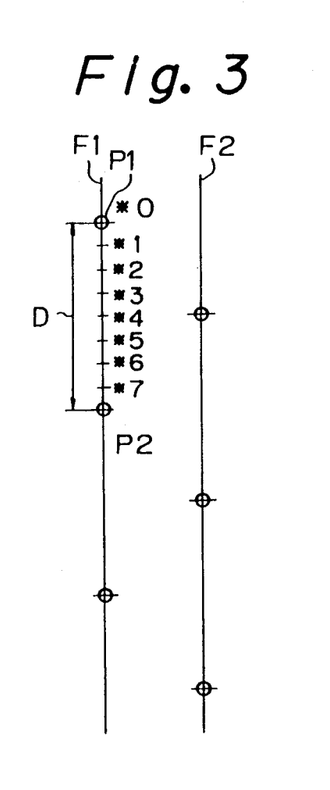
FIGS. 3 and 4 are diagrams for describing conventional linear interpolation.
Figure 4:
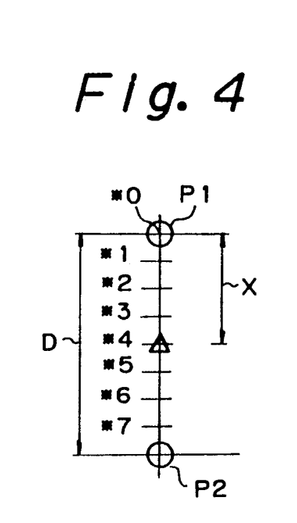

In linear interpolation, the two picture elements which are the closest to an interpolation point are selected, and the picture element data of the two picture elements are divided by the ratio of the distances between two picture elements. As shown in FIGS. 3 and 4, the distance between the original picture elements P1 and P2 is D, and a picture element which is to be interpolated is indicated by Δ and is located at a distance x from the original picture element P1. Assume that the picture element data of the original picture elements P1 and P2 are T and Q, respectively. As a result a value R of the interpolation picture element may be expressed by the following equation:

$$R = (1 - X/D) \cdot T + \frac{X}{D} \cdot Q \quad (1)$$

The linear interpolation can be achieved by a filter having a characteristic of a linear impulse response.

In FIGS. 3 and 4, each value of the eight interpolation points *0 - *7 is obtained by the following equations:

$$*0 \quad x = 0 \cdot D \quad R = T \quad (2)$$

-continued $$*1 \quad x = (1/8) \cdot D \quad R = (7/8)T + (1/8)Q \quad (3)$$
$$*2 \quad x = (2/8) \cdot D \quad R = (6/8)T + (2/8)Q \quad (4)$$
$$*3 \quad x = (3/8) \cdot D \quad R = (5/8)T + (3/8)Q \quad (5)$$
$$*4 \quad x = (4/8) \cdot D \quad R = (4/8)T + (4/8)Q \quad (6)$$
$$*5 \quad x = (5/8) \cdot D \quad R = (3/8)T + (5/8)Q \quad (7)$$
$$*6 \quad x = (6/8) \cdot D \quad R = (2/8)T + (6/8)Q \quad (8)$$
$$*7 \quad x = (7/8) \cdot D \quad R = (1/8)T + (7/8)Q \quad (9)$$

The interpolation of each of the interpolation points *0 - *7 is attained by a subfilter having a filtering coefficient which is provided by sampling an impulse response (interpolation function). The subfilter may include a well-known FIR type digital filter with two taps.

Thus, the value of each of the interpolation values *0 to *7 shown in FIGS. 3 and 4 is obtained using a subfilter having a coefficient corresponding to the above equations.

As is to be appreciated from the above-mentioned equations (2) to (9), if the impulse response is symmetrical, then the sets of the subfilters have combinations of the same coefficient sets. For example, if the impulse response is represented by either equations (3) and (9), (4) and (8) or (5) and (7), then the corresponding sets of subfilters would have the same characteristic even though the arrangement of the coefficients is reverse. More specifically, interpolation points *1 and *7, *2 and *6, and *3 and *5 are interpolated by respective subfilters having the same respective characteristic. Therefore, in the interpolation shown in FIG. 2, only the equations (4) and (8) in the first field F1 and the equations (2) and (6) in the second field F2 are utilized. As a result, since the sets of subfilters have different characteristics, flickering tends to occur.

OBJECT AND SUMMARY OF THE INVENTION

Accordingly, it is an object of the present invention to provide an apparatus for converting a television signal providing a picture of a first size to a television signal providing a picture of a second size which avoids the above-mentioned disadvantages of the prior art.

More specifically, it is an object of the present invention to provide an apparatus as aforementioned which is capable of preventing the generation of flickering when an original picture provided by a television signal is magnified or reduced by an arbitrary integer ratio.

According to an aspect of the present invention, apparatus for converting a television signal providing a picture of a first size M to a television signal providing a picture of a second size N, with M and N each being an integer, and with each television signal having odd and even fields which are interlaced with each other and which are each comprised of picture elements having a respective predetermined distance between adjacent picture elements in the vertical direction of the respective picture, comprises:

first input means for receiving a command signal which includes a conversion ratio equal to M/N, second input means for receiving the television signal providing the picture of the first size, and interpolation means receiving the command signal and the television signal providing the picture of the first size from the first and second input means, respectively, and having digital filter means for generating a plurality of interpolation picture data between each pair of vertically adjacent picture elements in each of the odd and even fields of the television signal providing the picture of the first size in response to the command signal, the interpolation means extracts from each plurality of interpolation picture data a picture element vertically spaced a distance $|(M-N)/4|\cdot U$ from a position in the vertical direction that would be occupied by a picture element in the respective field of a television signal having the second size in which U is a unit distance obtained by dividing the distance between adjacent picture elements in a vertical direction in the picture of the first size or in the picture of the second size by a number equal to the integer N or M, respectively, so that any coefficient sets utilized by the digital filter means have the same characteristic. The present invention magnifies or reduces an original picture, provided by a television signal and having interlaced fields, by an integer ration of M to N, in which the distance between adjacent picture elements in the vertical direction of the original picture or a conversion picture is divided by a number equal to the integer M or N, respectively, for producing a unit length U, a plurality of interpolation data is generated between each pair of vertically adjacent picture elements in each field of the television signal producing the original picture, a picture element is extracted from each plurality of interpolation data and vertically spaced a distance $|(M-N)/4|\cdot U$ from a position in the vertical direction that would be occupied by a picture element in the respective field of a television signal producing the converted picture, and the extracted interpolation picture data is accumulated as a converted television signal for display.

The above, and other objects, features and advantages of the present invention will be apparent in the following detailed description of an illustrative embodiment when read in conjunction with the accompanying drawings in which corresponding parts are identified by the same reference characters.

DESCRIPTION OF THE PREFERRED EMBODIMENT

Figure 5:
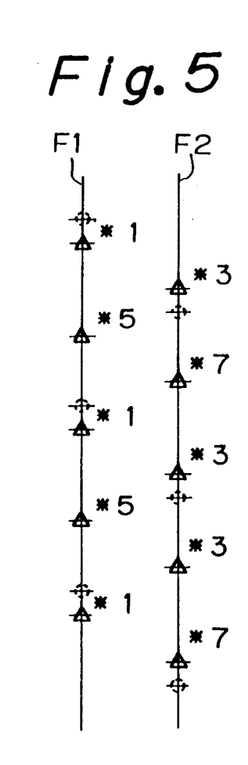
FIG. 5 is a diagram for describing the interpolation used in the present invention.

This invention enables the use of a set of subfilters having the same characteristics by shifting interpolation points as, for example, shown in FIG. 5. More specifically, in the first field F1, a set of subfilters having characteristics represented by the above-mentioned equations (3) and (7) are used and in the second field F2, a set of subfilters having characteristics represented by the equations (5) and (9) are employed. Therefore, in the example of FIG. 5, the same filtering characteristics are provided due to the symmetry of the impulse responses and, as a result, flickering is prevented. As mentioned hereinafter, the present invention can prevent flickering for the cases in which the magnification or reduction ratio is equal to an arbitrary integer.

An embodiment of the present invention will now be described with reference to FIGS. 6 to 15.

Figure 6:
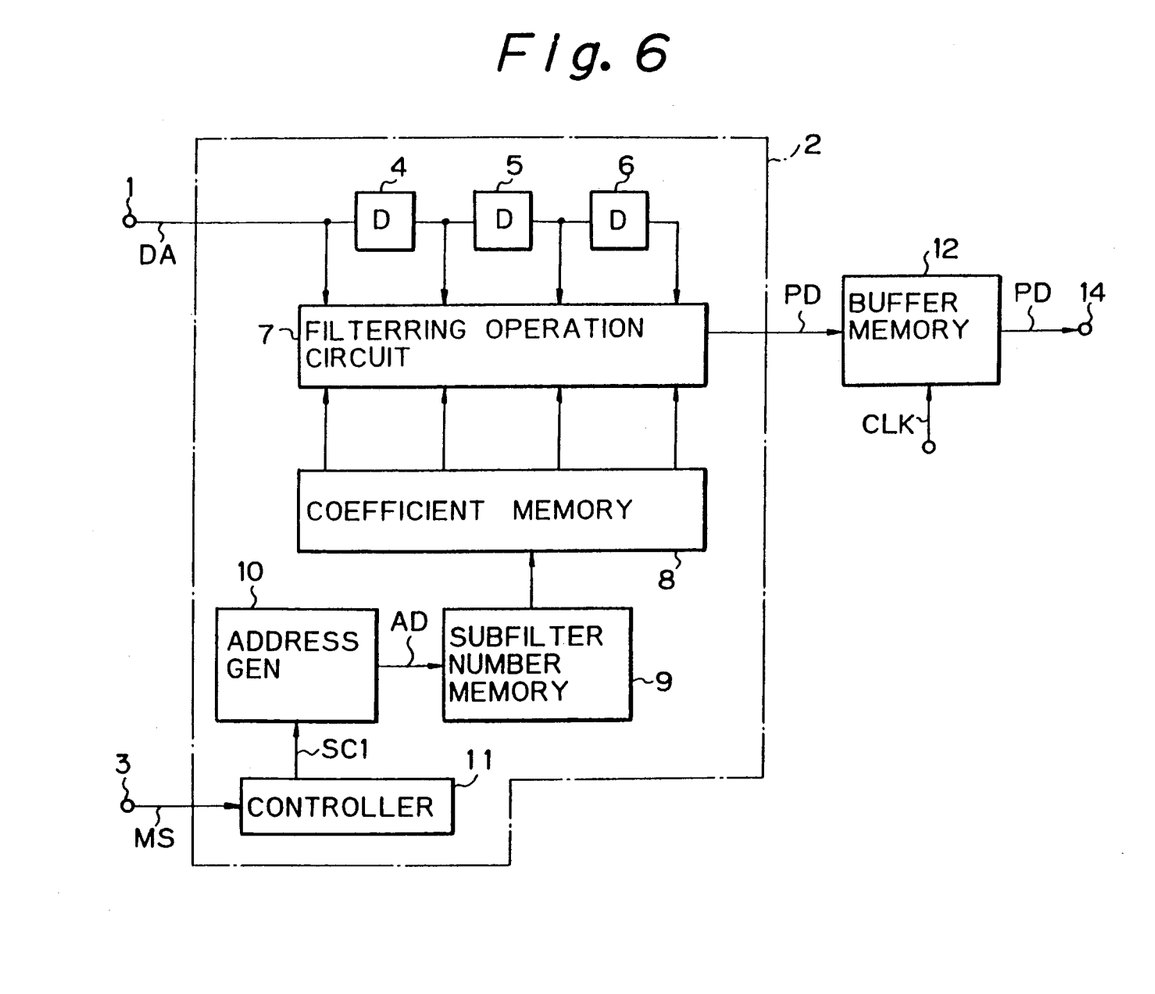
FIG. 6 is a block diagram of the converting apparatus according to an embodiment of the present invention.

As shown in FIG. 6, digital picture data DA (hereinafter, input data DA) of an original picture is supplied through an input terminal 1 to an interpolator 2. Further, a mode selection signal MS, which designates conditions such as magnification or reduction of the original picture and the ratio of magnification or reduction, is supplied to the interpolator 2 through an input terminal 3.

Interpolator 2 provides an interpolation signal from the input data DA on the basis of the mode selection signal MS. More specifically, the interpolator 2 interpolates picture elements arranged in the vertical direction of the same field of a picture. The interpolator 2 generally comprises a cascaded arrangement of delay circuits 4, 5 and 6, each of which has a delay time of 1 H synchronization period; a filter operation circuit 7; a coefficient memory 8; a subfilter number memory 9; an address generator 10; and a controller 11. The input data DA is supplied to the delay circuits 4, 5 and 6. The input data DA and the output data of each of the delay circuits 4, 5 and 6 are supplied to the filter operation circuit 7.

A controller 11 receives the mode selection signal MS and generates a control signal SC1 which is supplied to the address generator 10. The address generator 10 generates an address AD on the basis of the control signal SC1 which, in turn, is supplied to the subfilter number memory 9. The address AD varies every line, increases in a frame, and is reset every frame. Further, since the address AD is repeated every N lines, when the magnification or reduction ratio is M:N, the address generator 10 may include a counter for repeating the counts from 0 to $(N-1)$.

The subfilter number memory 9 generates a subfilter number SF on the basis of the address AD received from the above-mentioned address generator 10 which, in turn, is supplied to the coefficient memory 8. Since the subfilter numbers SFs vary line by line, they are stored in a state which is arranged in line order. A set of coefficients for each subfilter number SF are held by coefficient memory 8. In response to the subfilter number SF, which is received from the subfilter number memory 9, coefficient memory 8 supplies a set of coefficients, held for the respective subfilter, to the filter operation circuit 7.

Figure 7:
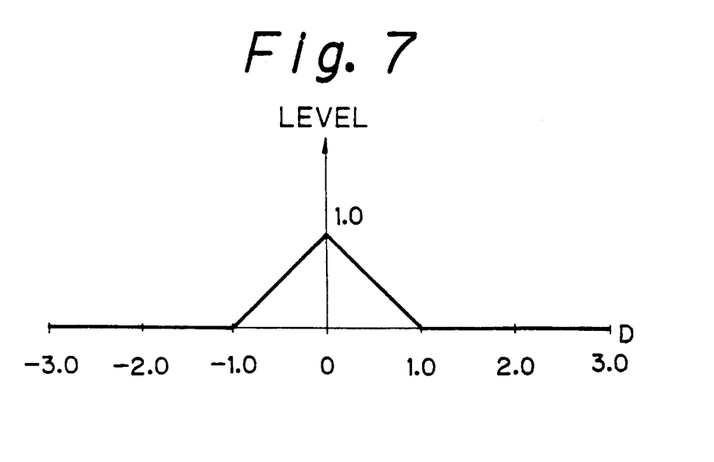
FIGS. 7 and 8 are diagrams for describing interpolation functions.
Figure 8:
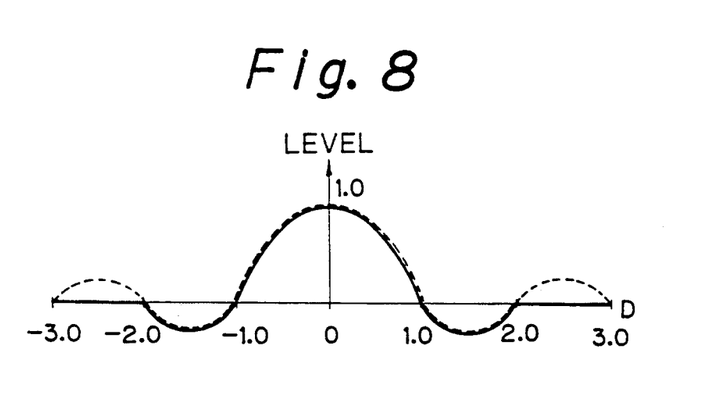

The filter operation circuit 7 preferably includes an FIR digital filter. The filter operation circuit 7 performs and interpolation operation based on an interpolation function. Examples of which are shown in FIGS. 7 and 8. In FIGS. 7 and 8, normalization is made to D=1.0.

The linear function in the range lying outside of $D=\pm 1.0$ and where the level is equal to zero, shown in FIG. 7, may be used as the interpolation function in the present embodiment, whereupon an interpolation operation may be performed depending on the magnification and reduction ratio for picture elements in the vertical direction of a picture. In the interpolation operation, the number of taps used varies depending on the time width of the interpolation function. As an example, in the case where a newly interpolated picture element is formed from two adjacent original picture elements, as in the above example, the circuit 7 functions as a two-tap FIR digital filter and, as a result, two sum-of-products operations are performed for every input data DA of a picture element. Further, in using certain interpolation functions, the delay circuits 4, 5 and 6 and the filter operation circuit 6 must be provided in parallel form with respective numbers. More specifically, when there is a tap which is not in use, a value of 0 is supplied to the multiplier (not shown) corresponding to the unused tap as a filter coefficient or otherwise the picture element data PD is not supplied to the buffer memory 12. Further, as previously mentioned, other interpolation functions, for example, those indicated by a solid line and a broken line in FIG. 8, may be employed.

In the case in which the impulse response shown by the solid line of FIG. 8 (level=0 in the range lying outside of $D = \pm 2.0$ is employed as the interpolation function, the interpolation operation is carried out from four picture elements in the vertical direction of the picture. Thus, the filtering operation circuit 7 functions as a four-tap FIR digital filter and, as a result, four sum-of-products operations are performed for every input data DA of a picture element. In the case in which the impulse response indicted by the broken line of FIG. 8 is the interpolation function, the filtering operation circuit 7 includes an FIR digital filter having more than four taps. In this case, more than four sum-of-products operations are performed for every input data DA of a picture element. The data PD, which is provided every picture element, is supplied to the buffer memory 12 at predetermined timing intervals and held therein.

Buffer memory 12 performs processing which rearranges the picture elements subjected to the increase or decrease manipulation, as previously described, into the same interval as the original picture. As shown in FIG. 6, a clock signal CLK is supplied through an input terminal 13 to buffer memory 12. The picture element data PD from the buffer memory 12 is taken out from a terminal 14, and thus is available to be displayed as a conversion picture by a CRT (not shown) or other display means.

Figure 9:
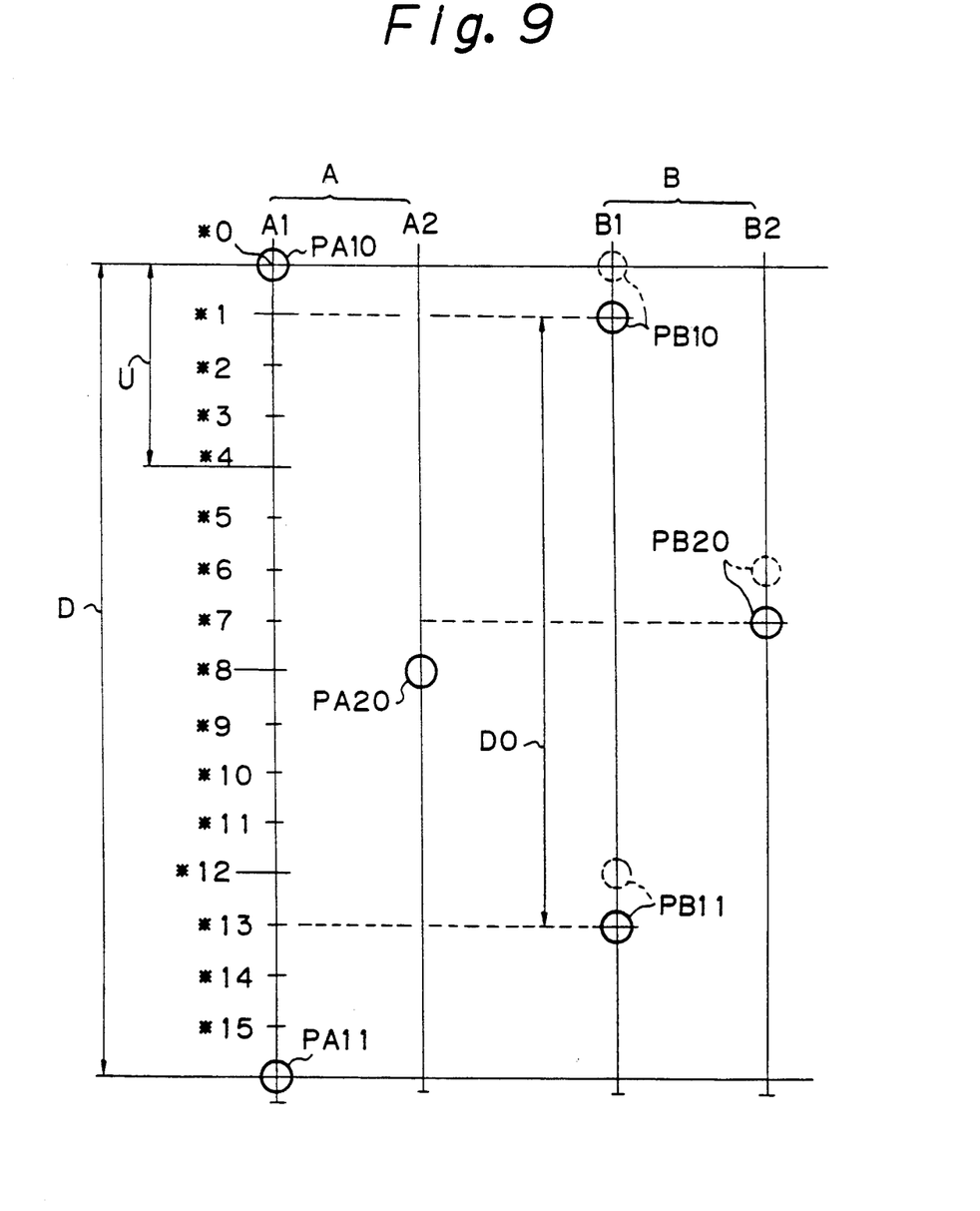
FIGS. 9 to 13 are diagrams for describing an embodiment of the present invention.

An example of magnification, in which the integer size conversion ration M:N of an original picture A to a conversion picture B is selected to be M=3 and N=4, will now be described with reference to FIGS. 9 and 10. A description of magnification and reduction in the horizontal direction of the picture is omitted, as these may be performed by an ordinary interpolation method. FIG. 9 is a diagram in which the spacing between picture elements pA10 and pA11 of FIG. 10 has been enlarged.

If the distance between picture elements of an original picture A is D, a unit length U is obtained when the distance D is divided by N, as shown in FIG. 9. As a result, the distance DO between picture elements of the conversion picture B is (M·U). Further, as shown in FIG. 10, a distance C which corresponds to (M) number of picture element intervals of the original picture A is equal to a distance CO which corresponds to (N) number of picture element intervals of the conversion picture B. These relationships may be expressed by the following equations:

$$M \cdot D = N \cdot DO = C = CO \quad (10)$$

$$DO = (M/N) \cdot D \quad (11)$$

$$U = (D/N) = (DO/M) \quad (12)$$

In this example, D=4U and DO=3U.

In a first field A1 of the original picture A, the position of an L-th picture element PA1L relative to the position of a preceding picture element PA10 is located at a distance of (L·N)·U from the position of the preceding picture element PA10. Thus, the positions of the picture elements in the first field A1 of FIG. 10 may be expressed as follows:

| Picture element | PA10 | PA11 | PA12 | PA13 |
|---|---|---|---|---|
| Position | 0U | 4U | 8U | 12U |

Similarly, in a first field B1 of the conversion picture B, the position of an LO-th picture element PB1L relative to the position of a preceding picture element PB10 is located at a distance of (LO·M) U from the position of the preceding picture element PB10. Thus, the positions of the picture elements in the first field B1 of FIG. 10 may be expressed as follows:

| Picture element | PB10 | PB11 | PB12 | PB13 | PB14 |
|---|---|---|---|---|---|
| Position | 0U | 3U | 6U | 9U | 12U |

Figure 10:
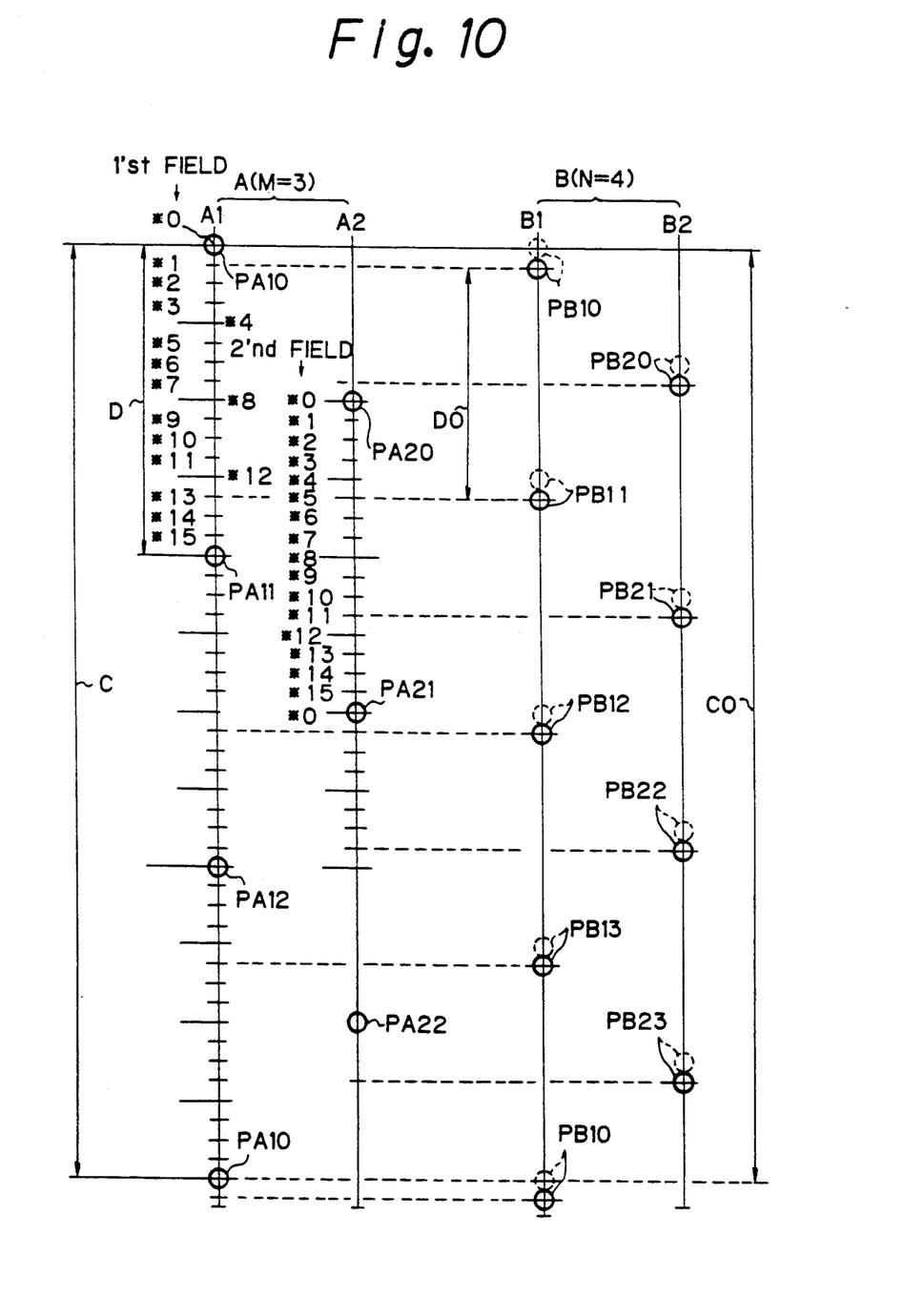

As is to be appreciated from FIGS. 9 and 10, the position of the picture element PA10 in the first field A1 of the original picture A is made to correspond in the vertical direction with the position of the picture element PB10 in the first field B1 of the conversion picture B. Further, by reference to the intervals obtained by dividing the unit length U by four or by dividing the distance D between vertically adjacent picture elements by 16 in the first field A1 of the original picture A (the intervals between elements PA10 and PA11 each being indicated by an asterisk *), the subfilter number SF to be used in the interpolation of each of the picture elements PB10, PB11, ... and so forth, is indicated by the interval number in the original Picture A corresponding to a circle indicated by a broken line in the conversion picture B. These subfilter SF numbers are indicated below, in which each is repeated every four picture elements.

| Picture element | PB10 | PB11 | PB12 | PB13 | PB14 |
|---|---|---|---|---|---|
| SF | *0 | *12 | *8 | *4 | *0 |

As shown in FIGS. 9 and 10, the position of a picture element PB20 in the second field B2 corresponds vertically with the middle of the picture elements PB10 an PB11 of the first field B1 of the conversion picture B. Further, by reference to the intervals obtained by dividing the unit length U by four or by dividing the distance D between vertically adjacent picture elements by 16 in the second field A2 of the original picture A, as shown in FIG. 10, in which the intervals between elements PA20 and PA21 are each indicated by and asterisk (*) the subfilter number SF to be used in the interpolation of each of the picture elements PB20, PB21, ... and so forth, is indicated by the interval number in the second field of the original picture A corresponding to a circle indicated by a broken line in the second field B2 of the conversion picture B. These subfilter SF numbers are indicated below:

| Picture element | PB20 | PB21 | PB22 | PB23 |
|---|---|---|---|---|
| SF | *14 | *10 | *6 | *2 |

As is to be appreciated from the above-mentioned linear interpolation equations, that is, equations 2-9, in this example, since the distance D between vertically adjacent picture elements of the original picture A is divided by 16, there are seven sets of subfilters which have the same coefficient set, that is, *1 and *15, *2 and *14, *3 and *13, *4 and *12, *5 and *11, *6 and *10, and *7 and *9.

However, the coefficient sets of the subfilter SF numbers of the first and second fields B1 and B2, respectively, to be used in the interpolation of the picture elements for the conversion picture B as previously identified are not the same as the subfilter numbers having the same coefficient sets as mentioned above. As a result, flickering is caused.

As previously indicated, the position of the L0-th picture element PB1L in the first field B1 of the conversion picture B is at a distance of (L0·M)U from the position of the preceding picture element PB10.

In the equation (1) representing the above-stated linear interpolation, the distance indicated by x may be expressed by the following equation:

$$(L0 \cdot M) \bmod N \qquad (13)$$

The equation (13) means modulo arithmetic of (L0·M) using N as the modulo and represents the remainder when (L0·M) is divided by N. The value of x, from equation 13, is repeated every N picture elements, as L0 is repeated. For example:

| | |
|---|---|
| when L0 is 1, 1 × ¾ = 0. | The remainder is 3. |
| when L0 is 2, 2 × ¾ = 1. | The remainder is 2. |
| when L0 is 3, 3 × ¾ = 2. | The remainder is 1. |
| when L0 is 4, 4 × ¾ = 3. | The remainder is 0. |
| when L0 is 1, 1 × ¾ = 0. | The remainder is 3. |

Thus, the remainders 3, 2, 1, 0, 3 . . . are repeated.

In the second field B2 of the conversion picture B, a L1 picture element is obtained by subtracting (0.5) from the corresponding picture element in the first field B1 and is made to a new picture element number. As an example the position of the first picture element PB20 is shifted by (D0/2=(M/2)U) with respect to the position of the picture element PB10 of the first field B1.

In a similar manner, the position of the first picture element PA20 of the second field A2 in the original picture A is shifted by (D/2=(N/2)U) with respect to the position of the picture element PA10 of the first field A1. As a result, the distance indicated by x in the equation (1) representing the above-mentioned linear interpolation may be expressed by the following equation:

$$[L1 \cdot M + (M/2) - (N/2)] \bmod N \qquad (14)$$

The equation (14) is a modulo calculation of the bracketed quantity by the modulo N. Here, in the equation (14), the value of x is repeated every N picture elements as L1 is repeated.

Consequently, in the first and second fields B1 and B2 of the conversion picture B, there are N picture elements, that is, from 0 to (N−1), corresponding to L0 and L1, each having respective distances x.

Thus, in the first field B1, the respective values of x are:

$$0, M \bmod N, 2 M \bmod N, \sim, (N-1) M \bmod N \qquad (15)$$

In the second field B2, the respective values of x are:

$$((M - N)/2) \bmod N, (M + ((M - N)/2)) \bmod N, \qquad (16)$$
$$(2M + ((M - N)/2)) \bmod N, \sim,$$
$$((N - 1)M + ((M - N)/2)) \bmod N$$

Here, because of $0 \leq x < N$ and the symmetry of the impulse response, $0 \leq x < (N/2)$ and $(N/2) \leq x < N$ are symmetrical with each other. The combination of x and (N−x) results in a subfilter having the same characteristics.

Therefore, the same coefficient sets are combined so as to prevent flickering. When x is equal to (N−x), thus having a combination of the same coefficient sets, it is necessary to divide ((M−N)/2)U, which is the shift of the equations (15) and (16), into both sets.

As a result, it is necessary for the positions of the first picture elements PB10 and PB20 to be shifted by ((M−N)/2)U/2=((M−N)/4U. This shift may be done upwards or downwards in the vertical direction of the picture shown in FIGS. 9 or 10.

Since in the above example described with reference to FIGS. 9 and 10, M=3 and N=4, a shift of |(M−N)/4|U=¼·U is obtained. Thus, the positions of the picture elements PB10, PB11, . . . in the first field B1 and picture elements PB20, PB21 . . . in the second field B2 of the conversion picture B are shifted by (¼·U), in which each subfilter number SF is indicated by the interval number in the corresponding field of the original picture A which corresponds to the respective solid line circle in the conversion picture B. The subfilter SF numbers for the first field B1 are indicated below:

| Picture element | PB10 | PB11 | PB12 | PB13 | PB14 |
|---|---|---|---|---|---|
| SF | *1 | *13 | *9 | *5 | *1 |

The subfilter SF numbers for the second field B2 are indicated below:

| Picture element | PB20 | PB21 | PB22 | PB23 | PB24 (not shown in FIG. 10) |
|---|---|---|---|---|---|
| SF | *15 | *11 | *7 | *3 | *15 |

The subfilter SF numbers use in this example are *1, *13, *9, *5 in the first field B1 and *15, *11, *7, *3 in the second field B2. thus the subfilters have the same characteristic.

Therefore, the above described embodiment of the present invention prevents the generation of flickering when an original picture is magnified or reduced by an arbitrary integer ratio. Further, since the conversion picture B is formed by magnifying or reducing the original picture A, the present invention may be utilized in several applications, for example, conversions between picture formats such as HDTV, NTSC or CIF, standard conversions, sampling frequency conversions, special effects, zooming functions and picture distortion corrections.

An example of an original picture reduced into a conversion picture at a ration M:N, in which M=4 and N=3, will now be explained by referring to FIG. 11. As previously indicated, similar portions are identified by symbols identical to those used in the above-mentioned magnification example and, as such, a duplicate explanation pertaining thereto is omitted. Applying the configuration of FIG. 11 to equation 12 produces the following:

$$U=(D/N)=(DO/M)=(D/3)=(DO/4) \quad (17)$$

Thus, in this example, D=3U and DO=4U.

The position of the L-th picture element PAIL in the first field A1 of the original picture A is located at a distance of (L·N) U from the position of the preceding picture element PA10. In this example, since N is selected to be 3, each of the picture elements PA10 to PA14 is at the following position:

| Picture element | PA10 | PA11 | PA12 | PA13 | PA14 |
|---|---|---|---|---|---|
| Position | 0U | 3U | 6U | 9U | 12U |

On the other hand, the position of the LO-th picture element PB1L in the first field B1 of the conversion picture B is at a distance of (LO·M) U from the position of the preceding picture element PB10. In this example, since M is selected to be 4, each of the picture elements PB10 to PB13 is at the following position:

| Picture element | PB10 | PB11 | PB12 | PB13 |
|---|---|---|---|---|
| Position | 0U | 4U | 8U | 12U |

By reference to the intervals in field A1 of the original picture A obtained by dividing the unit length U by four or by dividing the distance D by twelve, the subfilter number SF to be used in the interpolation of each of the picture elements PB10, PB11, ... and so forth, is indicated by the interval number in field A1 of the original picture A, corresponding to a circle marked in a broken line in field B1 of the conversion picture B. These subfilter SF numbers are indicated below, in which the subfilter number SF is repeated every three picture elements.

| Picture element | PB10 | PB11 | PB12 | PB13 |
|---|---|---|---|---|
| SF | *0 | *4 | *8 | *0 |

Further, by reference to the intervals obtained by dividing the unit length U by four or by dividing the distance D between vertically adjacent picture elements in the second field A2 of the original picture A by twelve (not shown in FIG. 11), the subfilter number SF to be used in the interpolation of each of the picture elements PB20, PB21 ... and so forth, is indicated by the interval number in the second field of the original picture corresponding to a circle indicated by a broken line in the second field B2 of the conversion picture B. These subfilter SF numbers are indicated below, in which each subfilter number SF is repeated every three picture elements.

| Picture element | PB20 | PB21 | PB22 |
|---|---|---|---|
| SF | *2 | *6 | *10 |

Figure 11:
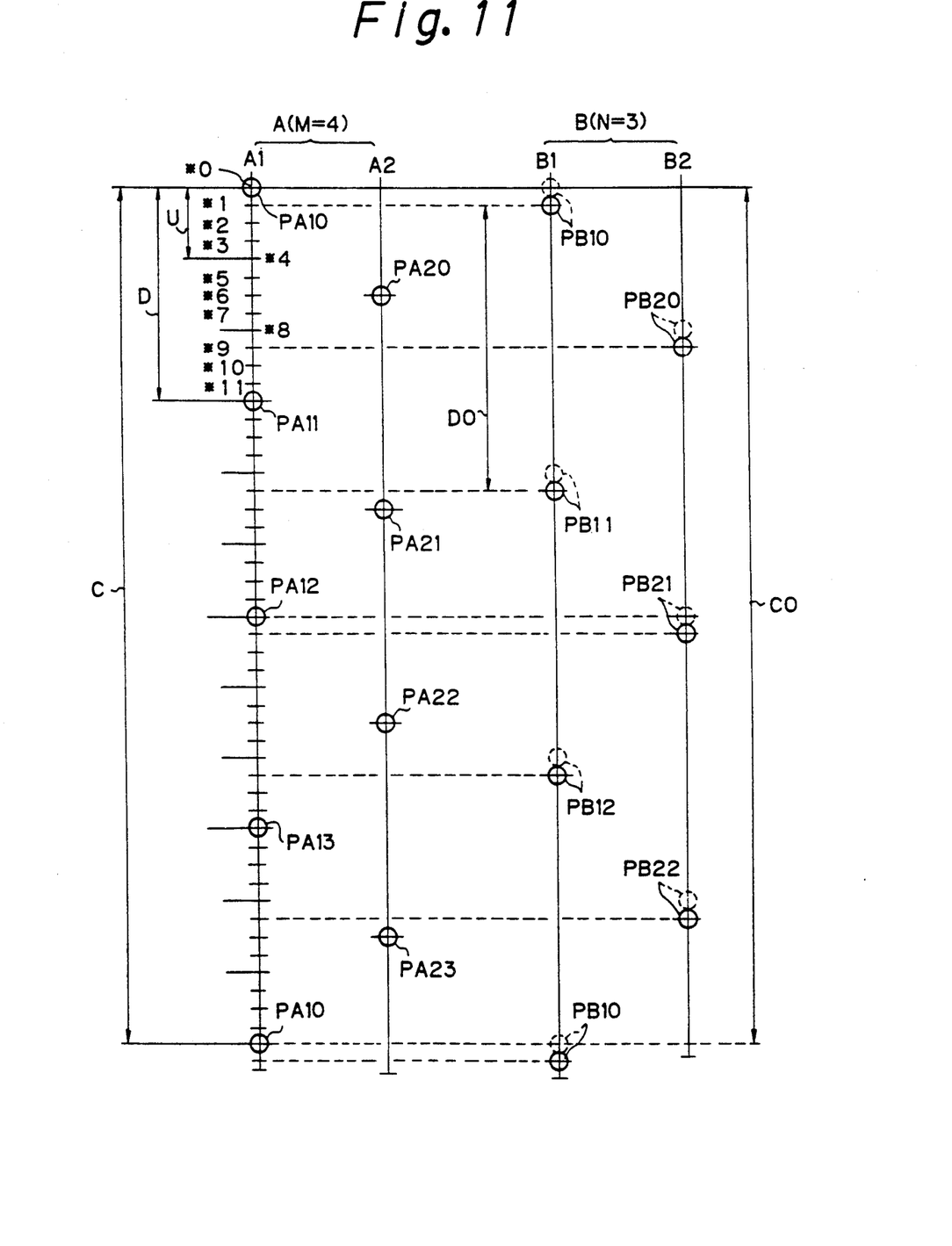

To prevent flickering in the example of FIG. 11, a shift of $|(M-N)/4| \cdot U = (\frac{1}{4})U$ ($\therefore M=4, N=3$) is established. After the shift of ($\frac{1}{4}$) of the unit length U is performed, each subfilter number SF is indicated by the interval number in picture A corresponding to the respective solid line circle in conversion picture B. The subfilter SF numbers for the first field B1 are indicated below in which the picture element PA10 of the first field A1 of the original picture A is used as a reference:

| Picture element | PB10 | PB11 | PB12 | PB13 |
|---|---|---|---|---|
| SF | *1 | *5 | *9 | *1 |

The subfilter SF numbers for the second field B2 are indicated below, in which the picture element PA20 of the second filed A2 of the original picture A is used as a reference.

| Picture element | PB20 | PB21 | PB22 |
|---|---|---|---|
| SF | *3 | *7 | *11 |

In this example, since the distance D between vertically adjacent picture elements of the original picture A is divided by twelve, the subfilter sets which have the same coefficient sets are *1 and *11, *2 and *10, *3 and *9, *4 and *8, and *5 and *7. The subfilter SF numbers used in this example are *1, *5, *9 in the first field B1, and *3, *7, *11 in the second field B2. Thus the subfilters used in this example have the same characteristic.

It is to be appreciated that in describing the above example of FIG. 11, portions of the description which were similar to those of the above-stated magnification example of FIGS. 9 and 10 were omitted.

Next, an example of an original picture magnified into a conversion picture at a ratio M:N in which M=3 and N=5, will now be described by referring to FIG. 12. As previously indicated, similar portions are identified by symbols identical to those used in the above-mentioned magnification example and, as such, a duplicate explanation pertaining thereto is omitted.

Figure 12:
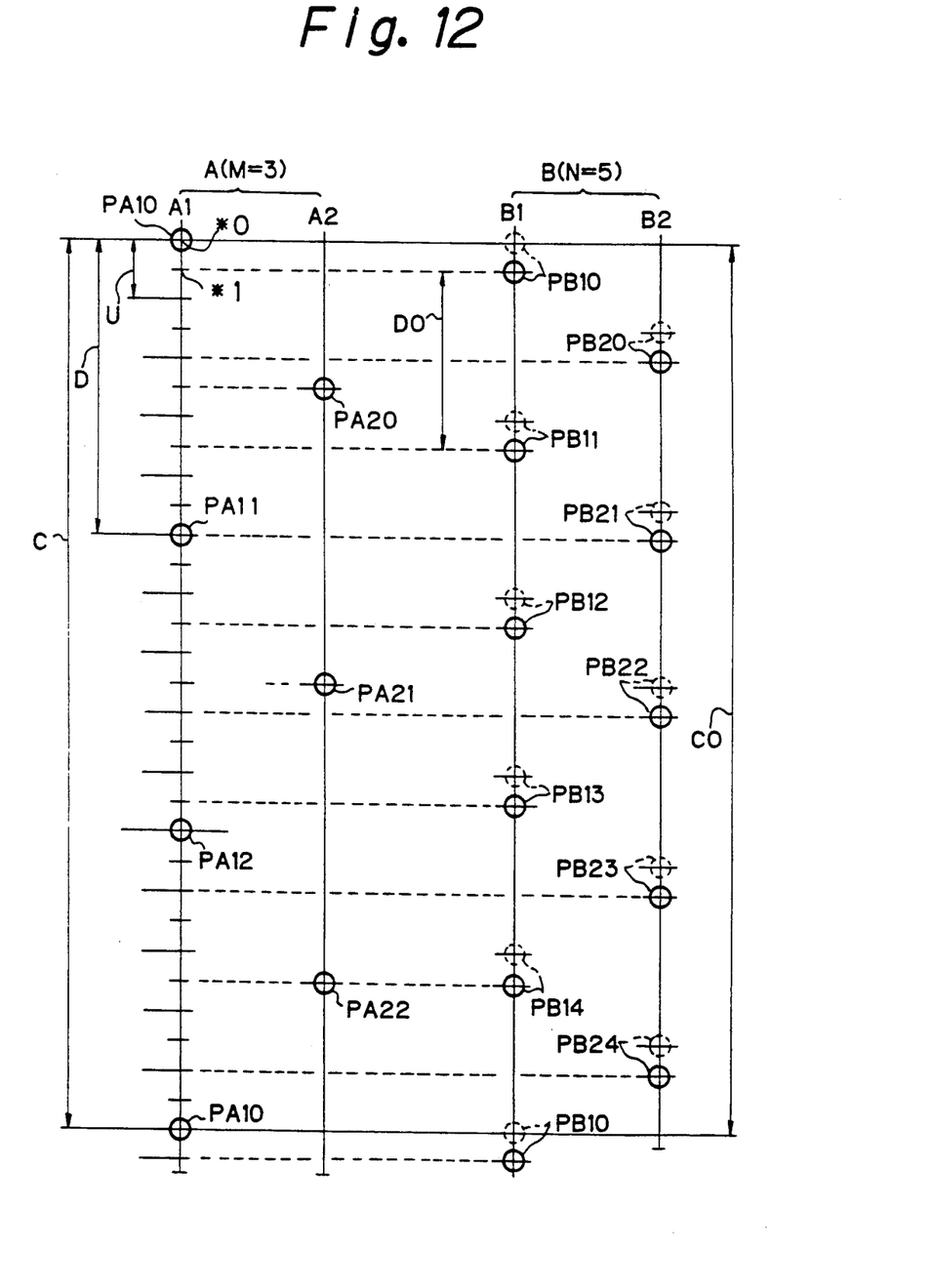

For equation 12 and FIG. 12, D=5U and DO=3U are established.

The position of the L-th picture element PAIL in the first field A1 of the original picture A is at a distance of (L·N)U from the position of the preceding picture element PA10. Since N is selected to be 5 in this example, each of the picture elements PA10 to PA13 is at the following position:

| Picture element | PA10 | PA11 | PA12 | PA13 |
|---|---|---|---|---|
| Position | 0U | 5U | 10U | 15U |

Meanwhile, the position of the L0-th picture element PB1L in the first field B1 of the conversion picture B is at a distance of (LO·M)U from the position of the preceding picture element PB10. Since M is selected to be 3 in this example, each of the picture elements PB10 to PB15 is at the following position:

| Picture element | PB10 | PB11 | PB12 | PB13 | PB14 | PB15 |
|---|---|---|---|---|---|---|
| Position | 0U | 3U | 6U | 9U | 12U | 15U |

By reference to the intervals obtained by dividing the unit length U by two or by dividing the distance D by ten as shown in FIG. 12, the subfilter number SF to be used in the interpolation of each of the picture elements PB10, PB11, . . . and so forth, is indicated by the interval number in field A1 of the original picture A corresponding to a circle indicated by a broken line in field B1 of the conversion picture B. These subfilter SF numbers are indicated below, in which the subfilter number SF is repeated every five picture elements.

| Picture element | PB10 | PB11 | PB12 | PB13 | PB14 | PB15 |
|---|---|---|---|---|---|---|
| SF | *0 | *6 | *2 | *8 | *4 | *0 |

Further, with regards to the second field B2 of the conversion picture B shown in FIG. 12, the subfilter number SF to be used in the interpolation of each of the picture elements PB20, PB21, . . . and so forth, is indicated by the interval number in field A2 of the original picture A corresponding to a circle indicated by a broken line in the second field of the conversion picture, in which the intervals formed in field A2 of picture A (not shown) are obtained by dividing the unit length U by two or by dividing the distance D between vertically adjacent picture elements in the second field of the original picture by ten. These subfilter SF numbers are indicated below, in which each of the subfilter number SF is repeated every five picture elements.

| Picture element | PB20 | PB21 | PB22 | PB23 | PB24 |
|---|---|---|---|---|---|
| SF | *8 | *4 | *0 | *6 | *2 |

To prevent flickering, a shift of $|(M-N)/4|\cdot U = (\frac{1}{2})U$ ($\because M=3, N=5$) is established in the example of FIG. 12. Each subfilter number after this shift is performed is indicated by the interval number in picture A corresponding to the respective solid line circle in conversion picture B. The subfilter SF numbers for the first field B1 are indicated below, in which the picture element PA10 of the first field A1 of the original picture A is used as a reference:

| Picture element | PB10 | PB11 | PB12 | PB13 | PB14 | PB15 |
|---|---|---|---|---|---|---|
| SF | *1 | *7 | *3 | *9 | *5 | *1 |

The subfilter SF numbers for the second field B2 are indicated below, in which the picture element PA20 of the second field A2 of the original picture A is used as a reference:

| Picture element | PB20 | PB21 | PB22 | PB23 | PB24 |
|---|---|---|---|---|---|
| SF | *9 | *5 | *1 | *7 | *3 |

Since the distance D between vertically adjacent picture elements of the original picture A is divided by 10 in this example, there are four sets of subfilters which have the same coefficient set, that is, *1 and *9, *2 and *8, *3 and 7, and *4 and *6.

The subfilter SF numbers used in this example are *1, *7, *3, *9, *5 in the first field B1, and *1, *7, *3, *9, *5 in the second field B2. Thus, the coefficient sets of the subfilters used in this example have the same characteristic.

In describing the above example of FIG. 12, portions of the description which were similar to those of the above-described magnification example where omitted.

Next, an example of an original picture reduced to a conversion picture at a ratio M:N, in which M=5 and N=3, will now be explained by referring to FIG. 13. As previously indicated, similar portions are identified by symbols identical to those used in the above-mentioned magnification example, and, as such, a duplicate explanation pertaining thereto is omitted. Applying the configuration of FIG. 13 to equation 12 produces the following:

$$U=(D/N)=(DO/M)=(D/3)=(DO/5) \tag{19}$$

Thus, in this example, D=3U and DO=5U.

In the first field A1 of the original picture A, the position of the L-th picture element PA1L is at a distance of (L·N)U from the position of the preceding picture element PA10. Since N=3 in this example, each of the picture elements PA10 to PA15 is at the following position:

| Picture element | PA10 | PA11 | PA12 | PA13 | PA14 | PA15 |
|---|---|---|---|---|---|---|
| Position | 0U | 3U | 6U | 9U | 12U | 15U |

Meanwhile in the first field B1 of the conversion picture B, the position of the LO-th picture element PB1L is at a distance of (LO·M)U from the position of the preceding picture element PB10. In this example, since M is selected to be 5, each of the picture elements PB10 to PB13 is at the following position:

| Picture element | PB10 | PB11 | PB12 | PB13 |
|---|---|---|---|---|
| Position | 0U | 5U | 10U | 15U |

Figure 13:
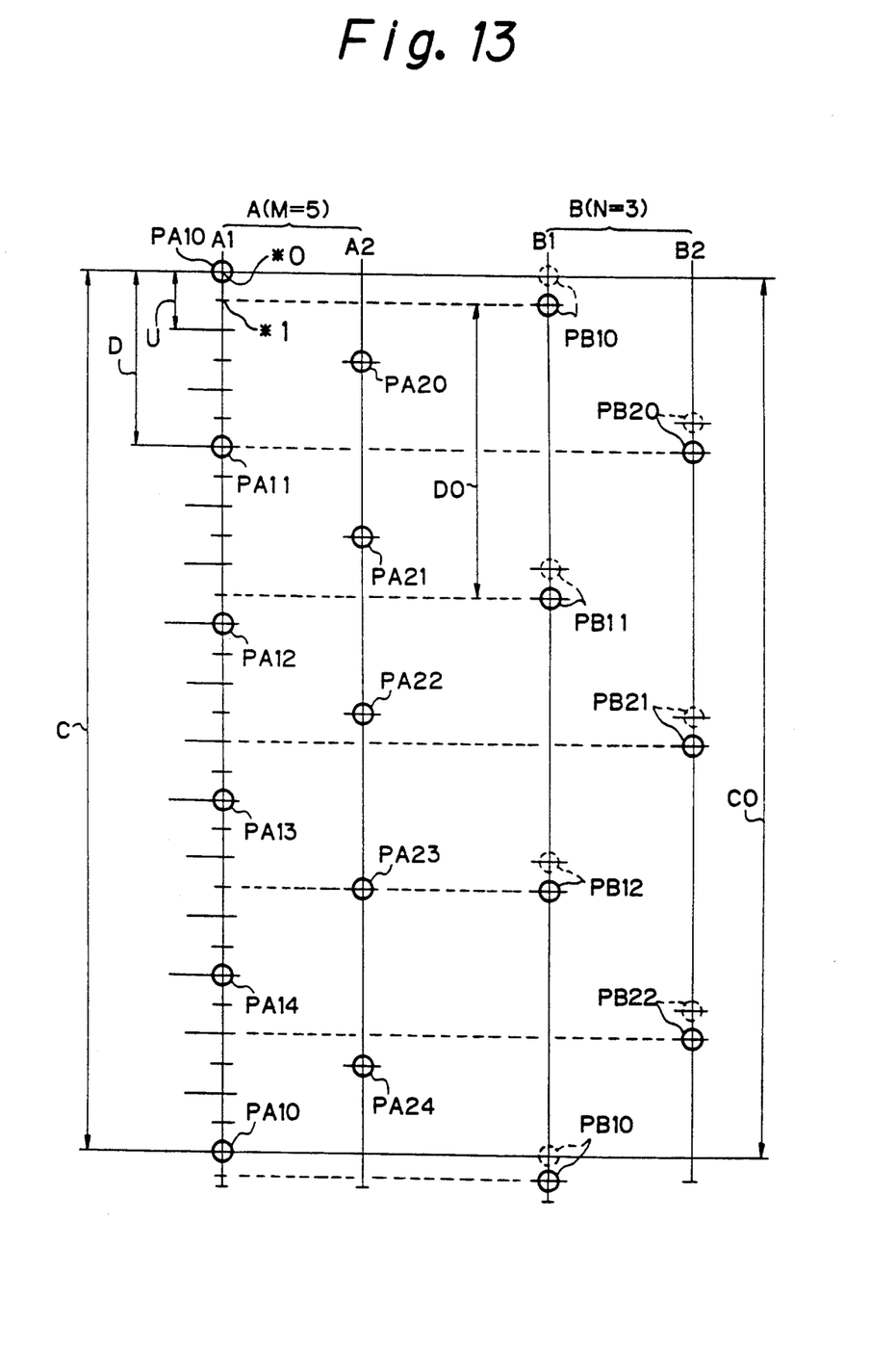

By reference to the intervals obtained by dividing the unit length U by two or by dividing the distance D by six as shown in FIG. 13, the subfilter number SF to be used for the interpolation of each of the picture elements PB10, PB11 . . . and so forth, is indicated by the interval number in field A1 of the original picture A corresponding to each respective circle indicated by a broken line in field B1 of the conversion picture B. These subfilter SF numbers are indicated below, in which the subfilter number SF is repeated every three picture elements.

| Picture element | PB10 | PB11 | PB12 | PB13 |
|---|---|---|---|---|
| SF | *0 | *4 | *2 | *0 |

With regards to the second field B2 of the conversion picture B, by reference to the intervals formed in field A2 of picture A (not shown) by dividing the unit length U by two or by dividing the distance D by six, the subfilter number SF to be used for the interpolation of each of the picture elements PB20, PB21, . . . and so forth, is indicated by the interval number in field A2 of picture A corresponding to each respective circle indicated by a broken line in field B2 of the conversion picture B. These subfilter SF numbers are indicated below, in which the subfilter number SF is repeated every three picture elements afterwards:

| Picture element | PB20 | PB21 | PB22 |
|---|---|---|---|
| SF | *2 | *0 | *4 |

To prevent flickering, a shift of $|(M-N)/4|\cdot U = (\frac{1}{2})U$ ($\because M=5, N=3$) is established in the example of FIG. 13. The subfilter SF numbers obtained after this shift is performed are indicated by the interval number in picture A corresponding to the respective solid line circles in conversion picture B. The subfilter SF numbers for the first field B1 are indicated below, in which the picture element PA10 of the first field A1 of the original picture A is used as a reference:

| Picture element | PB10 | PB11 | PB12 | PB13 |
|---|---|---|---|---|
| SF | *1 | *5 | *3 | *1 |

The subfilter SF numbers for the second field B2 are indicated below, in which the picture element PA 20 of the second field A2 of the original picture A is used as a reference:

| Picture element | PB20 | PB21 | PB22 |
|---|---|---|---|
| SF | *3 | *1 | *5 |

Since the distance D between vertically adjacent picture elements of the original picture A is divided by six in this example, there are two sets of subfilters (*1 and *5) and (*2 and *4) which have the same coefficient set.

The subfilter SF numbers used in this example are *1, *5 and *3 in the first field B1, and *1, *5 and *3 in the second field B2. Thus, the coefficient sets of these subfilters have the same characteristic. In this case, the digital filter characteristics in both fields are the same even without providing the shift of $|M-N|/4$. In describing the example of FIG. 13, portions of the description which were similar to those in the above-mentioned magnification example were omitted.

Figure 14:
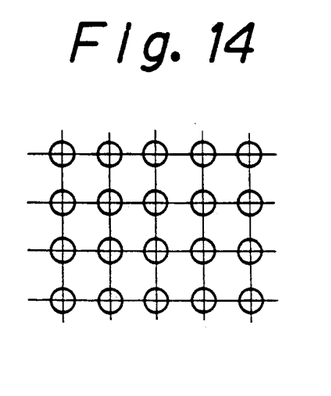
FIGS. 14 and 15 are diagrams showing samples of lattice arrangements of picture elements.
Figure 15:
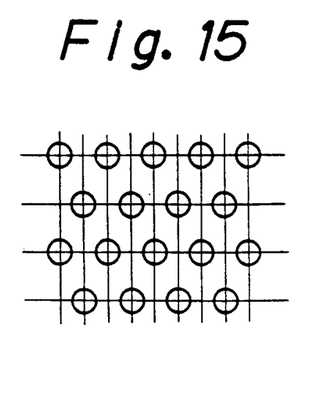

Even if offsetting is done every line, as in the example of a quincunx shown in FIG. 15, rather than an orthogonal sample lattice shown in FIG. 14, the technique described in the above embodiment of the present invention can be applied. More specifically, offsetting may be performed in the quincunx with respect to the horizontal direction of a picture as well as to vertical direction of the picture.

Further, the invention is applicable for correcting the shakiness caused by an operator's hand which, for example, may occur during the operation of a video camera. This shakiness may occur in areas of a picture where the contents can and cannot be corrected. As a result, when a picture located in the central area which is not affected by the hand shaking or in which the contents are not changed is magnified with the use of the present invention, the generation of flickering is prevented so as to eliminate the influence of the hand shaking.

According to the above-described embodiment of the present invention, in magnifying or reducing an original picture of an interlace system by an integer ration of M to N, a distance between adjacent picture elements in the vertical direction of the original or conversion pictures is divided by N or M, respectively, to provide a unit length U, and the positions of the picture elements of both fields of the conversion picture are shifted by $|(M-N)/4|\cdot U$ from the respective positions that would have been occupied by the picture elements of the conversion picture. As a result, the generation of flickering can be prevented when the original picture is magnified or reduced by an arbitrary ratio.

Further, the present invention may be utilized in numerous application, for example, conversions between picture formats such as HDTV, NTSC and CIF, standard conversions, sampling frequency conversions, special effects, zooming functions and picture distortion corrections.

Although a preferred embodiment of the present invention has been described in detail herein with reference to the accompanying drawings, it is to be understood that this invention is not limited to that precise embodiment, and that various changes and modification can be effected therein by one skilled in the art without departing from the spirit or scope of the invention as defined in the appended claims.

What is claimed is:

1. In a method for converting a television signal providing a picture of a first size M to a television signal providing a picture of a second size N, with M and N each being an integer, and with each television signal having odd and even fields which are interlaced with each other and which are each comprised of picture elements having a respective predetermined distance between adjacent picture elements in the vertical direction of the respective picture, the steps of:

dividing said distance between adjacent picture elements in a vertical direction in said picture of said first size or in said picture of said second size by a number equal to said integer N or M, respectively, for producing an unit distance U, generating a plurality of interpolation picture data between each pair of vertically adjacent picture elements in each of said odd and even fields of said television signal providing said picture of said first size, extracting from each said plurality of interpolation picture data a picture element vertically spaced a distance $|(M-N)/4|\cdot U$ from a position in the vertical direction that would be occupied by a picture element in the respective field of a television signal having said second size, and accumulating the extracted interpolation picture data as a converted television signal for display as said picture of said second size.

2. Apparatus for converting a television signal providing a picture of a first size M to a television signal providing a picture of a second size N, with M and N each being an integer, and with each said television signal having odd and even fields which are interlaced with each other and which are each comprised of picture elements having a respective predetermined distance between adjacent picture elements in the vertical direction of the respective picture, said apparatus comprising:

first input means for receiving a command signal which includes a conversion ratio equal to M/N, second input means for receiving said television signal providing said picture of said first size, and interpolation means receiving said command signal and said television signal providing said picture of said first size from said first and second input means, respectively, and having digital filter means for generating a plurality of interpolation picture data between each pair of vertically adjacent picture elements in each of said odd and even fields of said television signal providing said picture of said first size in response to said command signal, said interpolation means extracting from each said plurality of interpolation picture data a picture element vertically spaced a distance $|(M-N)/4| \cdot U$ from a position in the vertical direction that would be occupied by a picture element in the respective field of a television signal having said second size, and in which U is a unit distance obtained by dividing said distance between adjacent picture elements in a vertical direction in said picture of said first size or in said picture of said second size by a number equal to said integer N or M, respectively, so that the characteristics of said digital filter means used to generate the extracted picture elements are the same for said odd and even fields.

3. The apparatus according to claim 2, further comprising buffer memory means connected to said digital filter means for accumulating the extracted interpolation picture data as a converted television signal for display as said picture of said second size.

* * * * *